United States Patent [19]

Abe

[11] 4,340,105
[45] Jul. 20, 1982

[54] HEAVY LOAD TIRE WITH PLURAL PLY GROUPS OF DIFFERENT CORD DIAMETER

[75] Inventor: Masaru Abe, Sayama, Japan

[73] Assignee: Bridgestone Tire Company Limited, Tokyo, Japan

[21] Appl. No.: 238,798

[22] Filed: Feb. 27, 1981

Related U.S. Application Data

[63] Continuation of Ser. No. 49,857, Jun. 19, 1979, abandoned.

[30] Foreign Application Priority Data

Jun. 22, 1978 [JP] Japan .................................. 53-75676

[51] Int. Cl.³ .......................... B60C 9/06; B60C 15/00
[52] U.S. Cl. ............................ 152/354 R; 152/356 R; 152/357 R
[58] Field of Search ............... 152/356 R, 359, 354 R, 152/354 RB, 357 R, 362 R

[56] References Cited

U.S. PATENT DOCUMENTS

| 2,056,012 | 9/1936 | Madge et al. | 152/355 |
| 2,317,912 | 4/1943 | Howe | 152/356 |
| 2,990,870 | 7/1961 | Vittorelli | 152/356 |
| 4,029,137 | 6/1977 | Suydam | 152/302 R |

Primary Examiner—Michael W. Ball
Attorney, Agent, or Firm—Sughrue, Mion, Zinn, Macpeak & Seas

[57] ABSTRACT

A highly durable pneumatic tire comprising a bias laid carcass body composed of a plurality of stacks each including at least two superimposed rubberized organic fiber cord ply groups which are different in cord diameter. The ply groups are composed and arranged such that the cord diameters of the outermost ply group, the ply groups located adjacent to and inside the outermost ply group and the innermost ply group are the smallest, large and small in the order as mentioned above.

9 Claims, 10 Drawing Figures

HEAVY LOAD TIRE WITH PLURAL PLY GROUPS OF DIFFERENT CORD DIAMETER

This is a continuation of application Ser. No. 49,857, filed June 19, 1979 (now abandoned).

BACKGROUND OF THE INVENTION

1. Field of the Invention

This invention relates to pneumatic tires for heavy load vehicles and more particularly to a highly durable pneumatic tire comprising a bias laid carcass body composed of a plurality of stacks each including at least two superimposed rubberized organic fiber cord ply groups which are different in cord diameter and mainly used for trucks, trailers, construction vehicles, agricultural vehicles, industrial vehicles, airplanes or the like.

2. Description of the Prior Art

The above mentioned kind of tire comprising a bias laid carcass body composed of a plurality of stacks each including at least two superimposed rubberized organic fiber cord ply groups which are different in cord diameter has a number of advantages, but has a few disadvantages. The most important disadvantage is that the number of carcass plies must be substantially increased for the purpose of obtaining strength required for the condition under which the tire is used. This fact will now be described with reference to an example.

In a nylon cord of 1,260 denier/2 strands which has most widely been spread in the tire field, the number of carcass plies is usally increased up to 10 or 20 and exceeds 40 when the tire size becomes large. It is clear that the bias tire having such large number of superimposed carcass plies is not desirous in view of production efficiency and manufacturing cost if compared with a steel radial tire which could use only one ply even when the tire size is considerably large.

In order to decrease the number of plies with the required strength of the bias tire maintained, an easy-going method of increasing a cord diameter and the number of filaments correspondingly to increase the strength per 1 cord has heretofore been proposed. For example, the use of 1,890 denier/2 strands instead of 1,260 denier/2 strands ensures an increase of the cord strength up to 1.5 times stronger than that of the latter, thereby decreasing the number of plies to about 0.75 times smaller than that of the latter. It is a matter of course that the cord strength of the 1,890 denier/2 strands is not increased up to 1.5 times stronger than that of 1,260 denier/2 strands because the number of cords must be decreased in order to maintain a necessary gap between the cords. The conventional method of decreasing the number of carcass plies is capable of decreasing 30 plies to the order of 20 plies.

However, in the conventional method of decreasing the number of carcass plies, there is a risk of the tire being subjected to a cord breaking up failure which is a vital tire failure.

The cord breaking up failure shall be understood to mean breakage of cords of the carcass ply due to certain causes. The cord breaking up failure seldom occurs when the tire is used under appropriate conditions. But, an extreme decrease of an internal pressure of the tire or heavy load or sudden shock subjected to the tire results in the cord breaking up failure. In addition, if the strength of the carcass becomes small when the tire size is erroneously selected or the like, the cord breaking up failure becomes induced.

Investigations and experimental tests have demonstrated the result that, with the carcass strength be the same, the cord breaking up failure which has not so often been induced when a small cord diameter is used becomes so often induced when a large cord diameter is used.

SUMMARY OF THE INVENTION

An object of the invention, therefore, is to provide a pneumatic tire which can decrease the number of carcass plies and hence improve production efficiency and decrease manufacturing cost of the tire without inducing a cord breaking up failure even when the tire is used under various conditions and which can improve resistance to the cord breaking up failure without lowering productivity of the tire.

A feature of the invention is the provision of a pneumatic tire comprising a bias laid carcass body composed of a plurality of stacks each including at least two superimposed rubberized organic fiber cord ply groups which are different in cord diameter, the cords of substantially one-half of said plies extending in an opposite direction to the cords associated with the remainder of plies. The ply groups are composed and arranged such that the cord diameter of the outermost ply group is smaller than that of the ply group located adjacent to and inside said outermost ply group and at most equal to that of the innermost ply group. The cord diameter of the innermost carcass ply group is smaller than that of the ply group located adjacent to and outside said innermost carcass ply group.

Further objects and features of the invention will be fully understood from the following detailed description with reference to the accompanying drawings, wherein:

DETAILED DESCRIPTION OF THE PREFERRED EMBODIMENTS

Figure 1:
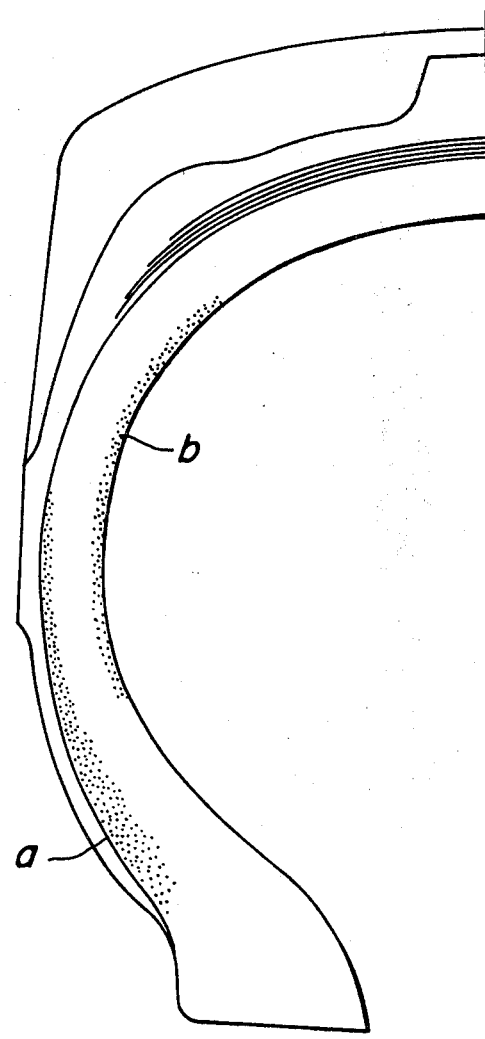
FIG. 1 is a cross-sectional view of one-half of a conventional pneumatic tire on a plane containing a rotational axis of the tire, showing regions where cord breaking up failures are induced.

In general, a large denier cord of an organic fiber cord having a large diameter and a small denier cord of an organic fiber cord having a small diameter are composed of a plurality of filaments which are the same in diameter, but are different in total number of filaments. In addition, the twist construction of these large and small denier cords is designed beforehand by those skilled in the fiber art such that the stress-strain curve of these large and small denier cords are theoretically the same with each other.

As a result, the fatigue property of these large and small denier cords is not different from each other in theoretical and experimental standpoint of view.

The use of the large denier cord or small denier cord is suitably selected by properties other than the fatigue resistant property required for such kind of tire, for example, cut resistant property, burst resistant property, separation resistant property, wear resistant property, heat generating property or the like in balance with productivity of the tire.

The reasons why the cord breaking up failure has more frequently been induced in the conventional tire having large denier cords and designed such that the strain subjected to various parts of the tire becomes substantially equal than the conventional tire having small denier cords have heretofore been not elucidated.

In the present invention, the conventional tires which have induced the cord breaking up failure have been investigated in detail and found out that the cord breaking up failure is due to compressive fatigue produced when the carcass cords are subjected to a repetition of compressive strain when the tire is running under load.

In the present invention, in the first place, that broken surface of the cord which was subjected to the cord breaking up failure is investigated in detail. Such investigations have demonstrated that the breakage of the filament results in the fatigue breakage of the filament per se constituting the cord judging from the broken surface of the filament. But, the conspicuous difference between the frequent occurrence of cord breaking up failure in the large denier cord and the occasional occurrence of cord breaking up failure in the small denier cord could not be understood if the above mentioned prior art definite opinion concerning the cord fatigue that the large denier cord and the small denier cord are the same in theoretical and experimental fatigue property.

The inventor has some doubts about the definite opinion concerning the cord fatigue owing to the fact that the definite opinion concerning the cord fatigue is contradictory to the real phenomenon.

In the present invention, "the definite opinion of the prior art technique concerning the cord fatigue" retroactive to the grounds therefore was investigated and found out that since the cord is subjected to the tensile stress all of the theoretical developments and experimental tests of the cord have been carried out on the base of the tensile strain or stress. As a result, the above mentioned definite opinion should strictly be applied to the tensile strain or stress. There are no grounds to be supported that the above mentioned definite opinion could also be applied to the compressive strain or stress.

FIG. 1 shows one-half of a conventional pneumatic tire in section taken on a plane containing a rotational axis of the tire. Referring to FIG. 1, reference symbol a designates a region in which a tensile stress is subjected to a cord when a tire is inflated by applying an internal pressure therein and which is located within a range between $\frac{1}{2}$ and $\frac{2}{3}$ times that of a crown portion. The region a is also an outer layer in which a carcass is subjected to compressive strain when the tire is running under load and which is located between a side portion and a bead portion. Reference symbol b designates a region in which a tensile stress is subjected to the cord when the tire is inflated by applying the internal pressure therein and which is located within a range between $\frac{1}{2}$ and $\frac{2}{3}$ times that of the crown portion. The invention has recognized that the compressive strain is concentrated onto both the inner layer of the shoulder portion and the inner layer of the side portion when the tire is running under such condition that the tire is inflated by applying a low internal pressure thereinto or the tire is subjected to extremely heavy load. The inventor has measured the ability of the cord of portions a and b when the tire is running under load and particularly measured the strain. It has been found that the region a is subjected to a large compressive strain when the tire is used under a normal condition and that the region b is subjected to a large compressive strain when the tire is inflated by applying a low internal pressure thereinto or when the tire is used under a extremely heavy load.

Figure 2:
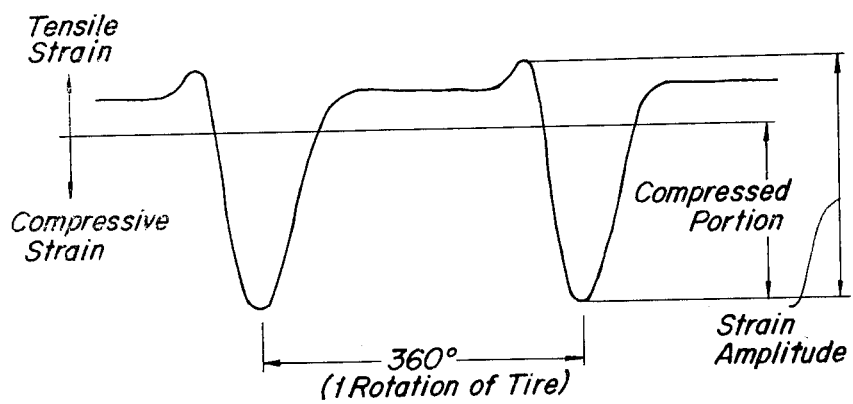
FIG. 2 is a graph illustrating strain measured at the regions shown in FIG. 1.

FIG. 2 shows the mode of occurrence of the above mentioned compressive strain.

The inventor recognized the compressive property of the cord by taking his consideration on the above mentioned "definite opinion of the prior art concerning the cord fatigue" and the ability of the strain produced on the cord into consideration. Elaborate experimental tests and investigations have shown that the fatigue resistant property of the cord when the cord is subjected to the compressive strain or stress becomes suddenly deteriorated in response to an increase of the cord diameter or total denier thereof. This phenomenon will now be described with reference to a practical example.

A plurality of cords to be tested were arranged around the periphery of the outer layer of a hollow cylinder formed of rubber and having an outer diameter of 40 mm and an inner diameter of 20 mm. The rubber cylinder was closed at its both ends and inflated by supplying air under pressure. The rubber cylinder was bent to incline its center axis at an angle of 90°. The bent rubber cylinder was mounted on a fatigue testing machine and rotated about its center axis at a speed of 100 r.p.m., thereby subjecting a compressive fatigue to the cord.

That is, the cord located at the bent portion was subjected to a tensile stress when the bent rubber cylinder is rotated and the cord at the bent portion arrives at the outside of the bent portion and was subjected to compressive strain which is two times stronger than the tensile strain when cord at the bent portion arrives at the inside of the bent portion.

Figure 3:
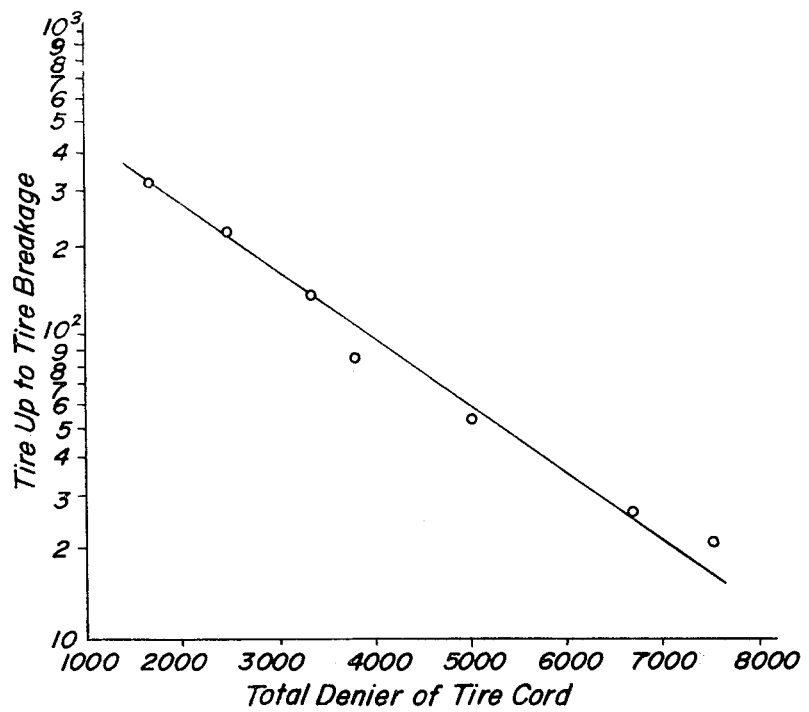
FIG. 3 is a graph illustrating time up to a tire breakage as a function of total denier of a tire cord.

FIG. 3 shows the test result for FIG. 2. In FIG. 3, the time to breakage of the rubber cylinder to be tested by the compressive fatigue is plotted on the ordinate in logarithmic scale and total denier of the cord to be tested is plotted on the abscissa.

As seen from FIG. 3, the compressive fatigue resistant property of the cord suddenly decreased in response to the increase of the total denier of the cord, that is, the cord diameter.

The invention is based on the above mentioned novel recognition. In order to attain the above mentioned object, further experimental tests and investigations effected in association with the above mentioned use have demonstrated that the basic elucidation of the following factors and the overall harmony among these factors ensure excellent results.

A: Dispersion and alleviation of strain or stress at a region extending from the shoulder portion through the side portion to the bead portion.

B: Suppression of the cord fatigue.

In the present invention, the carcass body is composed of a plurality of parallel rubberized cords formed of organic fiber such as nylon. The cords of about one-half of the plies extend in an opposite direction to the cords associated with the remainder of plies.

It is most desirous to use an even number of superimposed plies and extend the cords of each ply in an opposite direction to the cords associated with adjacent ply. Alternatively, the cords of the adjacent ply may partially be extended in the same direction as those of each ply. In addition, it is not always necessary to make the plies having the cords extending in the different direction the same in number.

The above mentioned carcass body is composed of at least two kinds of ply groups whose cords are different in diameter from each other.

The cord diameter of the outermost ply group is made smaller than that of the ply group adjacent to and inside the outermost ply group and is made at most equal to that of the innermost ply group. In addition, the cord diameter of the innermost ply group is made smaller than that of the ply group adjacent to and outside the innermost ply group.

That is, the plies of the first kind of group are composed of cords having certain cord diameter and the ply of the second kind of group are composed of cords whose diameters are different from that of the former. In addition, the ply of the nth kind of group is composed of cords whose diameter is different from those of the previous (n−1)th king of group. At least two kinds of the above mentioned plurality of kinds of ply group are combined and the ply group of the kind composed of cords having relatively smallest diameter is arranged at the outermost side of the carcass body and the ply group which is the same in kind as the ply group arranged at the outermost side or the ply group of the kind of the cord having a larger diameter is arranged at the innermost side of the carcass body.

It is the most preferable that between the outermost ply group and the innermost ply group is arranged remainder of a ply group composed of cords whose diameter is larger than that of the cords of both the outermost and the innermost ply groups. Eventually, a part of the remainder kind of ply group may be replaced by a cord group which is the same in kind as the innermost ply group.

It is convenient to represent a cord diameter by a thickness of a fabric composed of a plurality of parallel cords, so that, in the present invention, the cord diameter is defined by the above mentioned thickness of the parallel cord fabric.

The simplest construction of the carcass body makes use of two kinds of ply groups. In this case, the cord diameter ratio of these two kinds of ply groups is made within a range of 1:0.89 to 0.62. If the cord diameter ratio is smaller than 1:0.89, it is impossible to effectively improve the cord breaking up resistant property of the tire. On the contrary, if the cord diameter ratio is larger than 1:0.62, an excessive increase of the number of plies whose cords are small in diameter required for maintaining the same carcass strength results in an excessive increase of the thickness of the carcass, thereby increasing the compressive strain subjected to the carcass extending from the shoulder portion through the side portion to the bead portion and hence increasing the compressive strain subjected to the cord. In this case, it is also impossible to effectively improve the cord breaking up resistant property of the tire.

In addition, if the cord diameter ratio becomes excessively large, an excessively large shearing strain is produced between the boundary surface between the ply groups composed of these cords, thereby deteriorating the separation resistant property of the tire.

The above mentioned two kinds of ply groups having the above mentioned cord diameter ratio are arranged such that a ratio of number of plies of the innermost small diameter cord ply group to total number of plies excluding the turn-up portion of each ply at near the intermediate region between the maximum width position of the tire and the bead portion is within a range 0.06 and 0.67, preferably 0.11 and 0.55 and a ratio of number of plies of the outermost small diameter cord ply group to the total number of plies is within a range between 0.07 and 0.60.

If the ratio of the number of plies of the innermost small diameter cord ply group to the total number of plies is smaller than 0.06 and if the ratio of the number of plies of the outermost small diameter cord ply group to the total number of plies is smaller than 0.07, then it is impossible to effectively improve the cord breaking up resistant property. As a result, 0.06 and 0.07 should be made the lower limits, respectively.

On the contrary, if the ratio of the number of plies of the innermost small diameter cord ply group to the total number of plies of the carcass exceeeds 0.67 on if the ratio of the number of plies of the outermost small diameter cord ply group to the total number of plies exceeds 0.60, an excessive increase of the number of small diameter cord plies required for maintaining the same carcass strength, as in the case that the cord diameter ratio is excessively large, results in an excessively increase of the thickness of the carcass, thereby increasing the compressive strain subjected to the carcass extending from the shoulder portion through the side portion to the bead portion and hence increasing the compressive strain subjected to the cord. In this case, it is also impossible to effectively improve the cord breaking up resistant property of the tire. As a result, the upper limit of the ratio of the plies of the innermost small diameter cord ply group to the total number of plies of the carcass is made 0.67 and the upper limit of the ratio of the plies of the outermost small diameter cord ply group to the total number of plies of the carcass is made 0.60.

In the present invention, the maximum width position of the tire shall be understood to mean the maximum width position of the outermost layer of the carcass.

If the carcass body is composed of three kinds of cord ply groups, a ratio of the cord diameter of these three kinds of cord ply groups is made 1:0.89 to 0.62:0.73 to 0.40, counted from the large diameter cord. The reasons why the lower and upper limits of this cord diameter ratio are determined as such are substantially the same as those described with reference to the above mentioned case in which the carcass body is composed of two kinds of cord ply groups.

If these three kinds of cord ply groups are designated by reference symbols "L", "I" and "S" depending on the large, intermediate and small cord diameters, then it is most preferable to arrange these three kinds of cord ply groups in the order of "I", "L", "S", as viewed from the inside toward the outside of the carcass. Alternatively these three kinds of cord ply groups may be arranged in the order of "I", "L", "S"; "S", "L", "I", "S"; "S", "I", "L", "S"; or "S", "I", "L", "I", "S" or the like, as viewed from the inside toward the outside of the carcass.

In addition, the above mentioned three kinds of cord ply groups having the above mentioned cord diameter ratio are arranged such that a ratio of number of plies of the innermost intermediate diameter cord ply group or the innermost small diameter cord ply group to total number of plies excluding the turn-up portion of each cord ply and counted at the intermediate region between the maximum width position of the tire and the bead portion is within a range between 0.06 and 0.67, preferably a range between 0.10 and 0.50 and that a ratio of number of plies of the outermost small diameter cord ply group to the total number of plies is within a range between 0.07 and 0.60, preferably 0.11 and 0.55.

If the total number of plies is very large, it is a matter of course that the carcass body may be composed of a combination of more than four kinds of cord ply groups which are different in cord diameter.

In all of the above mentioned cases, it is preferable to arrange the cord ply groups such that a boundary surface formed between adjacent ply groups which are different in cord diameter is located between the inner plies of a first stack of plies wound around a first bead core in the same direction or located between the inner plies of a second stack of plies adjacent to said first stack of plies and wound around a second bead core in the same direction or a third stack of plies adjacent to said first or second plies and firmly secured at its one end to the lower surface of said first and/or second bead cores.

The kinds of cord ply groups which are different in cord diameter are combined and the ratio of these cord ply groups are selected in tire design which is effected by taking the condition under which the tire used and cost of the tire into consideration.

As stated hereinbefore, the invention is capable of reducing the number of carcass plies without inducing a cord breaking up failure or the like failures, thereby improving the production efficiency and lowering the manufacturing cost of the tire or is capable of improving the resistance to the cord breaking up failure without lowering the resistance to any other failures.

That is, the invention has a number of advantages. In the first place, it is possible to prevent the cord breaking up failure up to the final end of the tire life. Secondly, the most suitably selected diameter cords are most suitably arranged in dependance with the value of the compressive strain subjected to the cords when the tire runs under load and with the distribution of such compressive strain so as to make the cord fatigue condition of all of the plies the same, so that it is possible to decrease the thickness of the carcass if compared with the conventional tire which makes use of small diameter cords for all of the plies. Third, it is possible to decrease the compressive strain subjected to the shoulder portion through the side portion to the bead portion of the carcass, so that the tire according to the invention exhibits a cord breaking up resistant property which is far superior to that of the conventional tire all of plies of which are composed of small diameter cords. Fourth, the decrease of the number of plies result in an improvement of productivity and a reduction of the manufacturing cost. Fifth, since the thickness of the carcass is smaller than that of the conventional tire all of the plies of which are composed of small diameter cords, it is possible to effectively suppress accumulation of heat. Finally, since the cord diameter ratio is limited, it is possible to prevent the shearing strain from becoming excessively increased, thereby improving the separation resistant property of the tire.

The organic fiber cord used for the carcass ply may be formed of nylon, rayon, vinylon, polyester, aromatic polyamide fiber having a high modulus of elasticity or the like.

As can be seen from the above, preferred embodiments of a carcass body of a pneumatic tire according to the invention are obtained under the following limitations.

(1) A carcass body is composed of two kinds of ply groups which are different in cord diameter and a ratio of the cord diameters of these two kinds of ply groups is within a range between 1:0.89 to 0.62.

(2) A carcass body composed of two kinds of ply groups which are different in cord diameter is a stack of superimposed plies in which a ratio of number of plies of the innermost small diameter cord ply group to total number of plies excluding a turn-up portion of each ply and counted at the intermediate region between the maximum width position of the tire and a bead portion is within a range between 0.06 and 0.67 and a ratio of number of plies of the outermost small diameter cord ply group to said total number of plies is within a range between 0.07 and 0.60.

(3) A carcass body is composed of three kinds of ply groups which are different in cord diameter and a ratio of the cord diameters of these three kinds of ply groups is within a range of 1:0.89 to 0.62:0.73 to 0.73 to 0.40.

(4) A carcass body composed of three kinds of ply groups which are different in cord diameter is a stack of superimposed plies in which a ratio of number of plies of the innermost cord ply group to total number of plies excluding a turn-up portion of each ply and counted at the intermediate region between the maximum width position of the tire and a bead portion is within a range between 0.06 and 0.67 and a ratio of number of plies of the outermost cord ply group to said total number of plies is within a range between 0.07 and 0.60.

The invention will now be concretely described with reference to practical examples.

EXAMPLE 1

Figure 4:
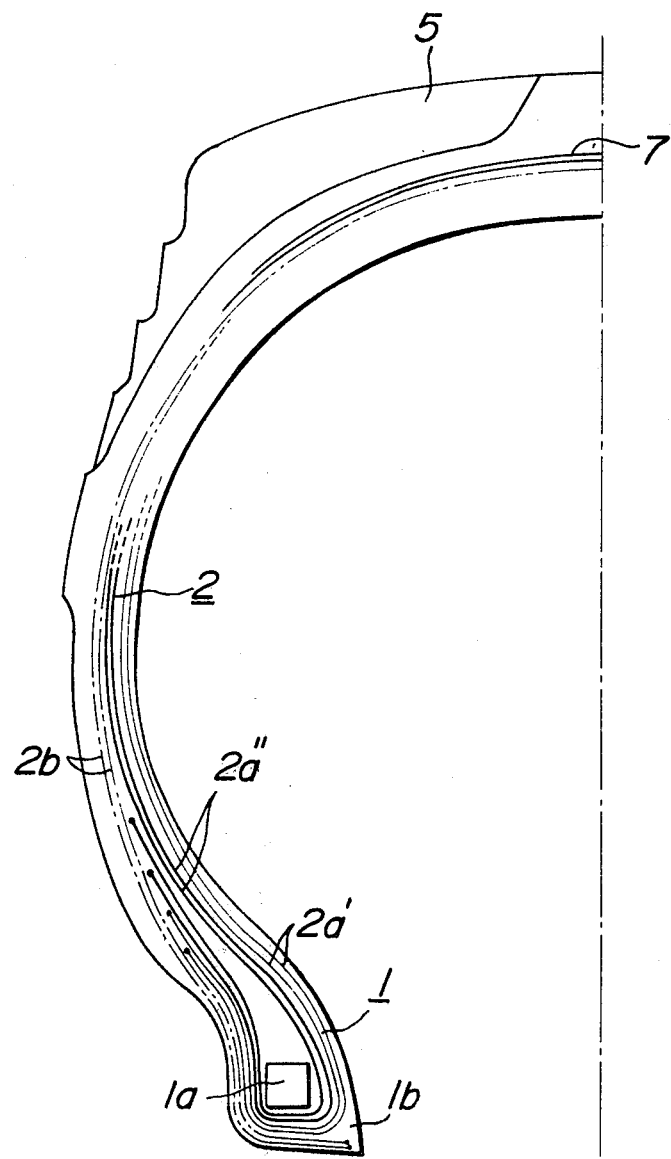
FIG. 4 is a cross-sectional view of one-half of an embodiment of a pneumatic tire according to the invention taken on a plane containing a rotational axis of the tire.

FIG. 4 shows one-half of an embodiment of a pneumatic tire according to the invention in section taken on a plane containing a rotational axis of the tire. The tire has a size of 700-12 12PR, 12PR being indicated on the basis of cotton yarn.

In the present example, a bead portion 1 comprises one set of bead core $1a$. A ply 2 for constituting a carcass body is composed of three kinds of nylon cord ply groups, that is 1,890 denier/2 strands, 1,260 denier/2 strands and 840 denier/2 strands. Total number of plies is 6.

Among the total plies, a ply stack $2a$ is composed of 4 nylon cord plies whose 2 inside cord plies $2a'$ is 1,260 denier/2 strands and 2 outside cord plies $2a''$ is 1,890 denier/2 strands. These inside and outside cord plies $2a'$, $2a''$ as a whole are wound around the bead core $1a$ from the inside toward the outside thereof to form turn-up portions. In addition, a ply stack 2b is composed of 2 nylon cord plies of 840 denier/2 strands. The ply stack 2b is bent at a bead heel portion from the outside toward the inside thereof and extends along the lower surface of the bead core 1a and firmly secured to a bead toe portion 1b.

The cords of each of these plies are inclined at about 40° with respect to the circumferential direction of the tire measured at the center part of the tire crown portion, but extend in an opposite direction to the cords associated with a adjacent ply.

About the outside of the plies 2 at the crown portion 5 is superimposed a breaker 7 composed of 2 nylon cords of 840 denier/2 strands.

In the present example, a cord diameter of the 1,890 denier/2 strands is 0.76 mm, a cord diameter of 1,260 denier/2 strands is 0.61 mm and a cord diameter of the 840 denier/2 strands is 0.51 mm. As a result, a ratio of these cord diameters is 1:0.80:0.67. A ratio of number of plies of the innermost intermediate diameter ply group of 1,260 denier/2 strands to the total number of plies is 0.33 and a ratio of number of plies of the outermost small diameter ply group of 840 denier/2 strands is 0.33.

Figure 5:
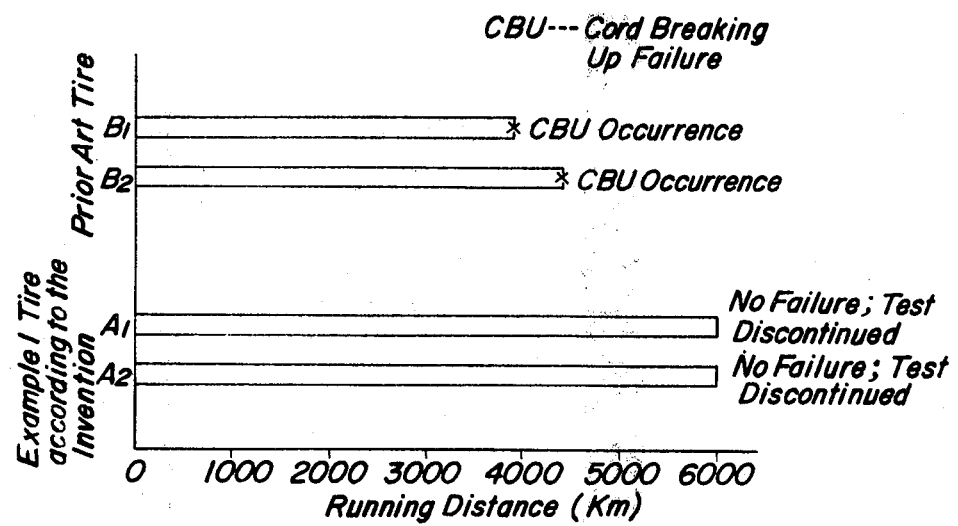
FIG. 5 is a graph illustrating a cord breaking up failure as a function of running distance of the tire according to the invention and shown in FIG. 4 as compared with that of a conventional tire.

FIG. 5 shows a graph illustrating an excellent resistance to cord breaking up failure of the present example. In FIG. 5, the kind of the tires to be tested is plotted on the ordinate, while the running distance is plotted on the abscissa. The resistance to the cord breaking up failure was tested by an acceleration test with the aid of an indoor drum testing machine under the same testing condition, that is, by using a normal rim of $5.00S \times 12DT$, internal pressure of 7.0 kg/cm$^2$ at a speed of 24 km/h under a load of 2,190 kg.

In FIG. 5, $A_1$ and $A_2$ show test results obtained by the tire constructed according to the invention with reference to the present example 1, while $B_1$ and $B_2$ show test results obtained by prior art tires. In the prior art tire, all of plies of the carcass as a whole are composed of a nylon cord of 1,260 denier/2 strands, the remainder of the tire inclusive of an overall strength of the carcass being the same as those of the example 1.

As can be seen from FIG. 5, the prior art tires $B_1$ and $B_2$ induced the cord breaking up failure at running distances of 3,900 km and 4,400 km, respectively. On the contrary, the tires $A_1$ and $A_2$ constructed according to the invention with reference to the example 1 did not induce any cord breaking up failure even after the running distance of 6,000 km where the running test was discontinued.

EXAMPLE 2

Figure 6:
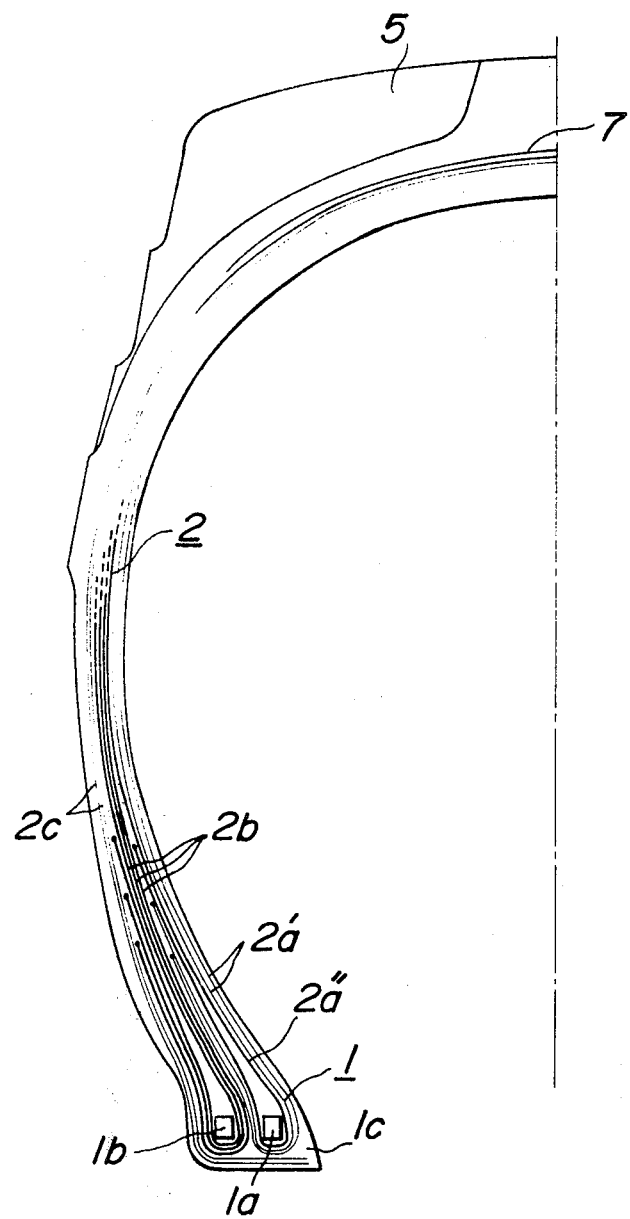
FIG. 6 is a cross-sectional view of one-half of another embodiment of a pneumatic tire according to the invention taken on a plane containing a rotational axis of the tire.

FIG. 6 shows one-half of another embodiment of a pneumatic tire according to the invention in section taken on a plane containing a rotational axis of the tire. The tire has a size of 10.00-20 14PR, 14PR being indicated on the basis of cotton yarn.

In the present example, a bead portion 1 comprises two sets of bead cores 1a, 1b. A ply 2 for constituting a carcass body is composed of two kinds of nylon cord ply groups, that is, 1,890 denier/2 strands and 1,260 denier/2 strands. Total number of plies is 8.

Among the total plies, a ply stack 2a is composed of 3 nylon cord plies where 2 inside cord plies 2a' are 1,260 denier/2 strands and 2 outside cord plies 2a" are 1,890 denier/2 strands. These inside and outside cord plies 2a', 2a" as a whole are wound around the bead core 1a from the inside toward the outside thereof to form turn-up portions.

A ply stack 2b is composed of 3 nylon cord plies of 1,890 denier/2 strands and wound around the bead core 1b from the inside toward the outside thereof to form turn-up portions. Finally, an outside ply stack 2c is composed of 2 nylon cord plies of 1,260 denier/2 strands and bent at a bead heel portion from the outside toward the inside thereof and extends along the lower surface of the bead cores 1b, 1a and firmly secured to a bead toe portion 1c.

The cords of each of these plies are inclined at about 40° with respect to the circumferential direction of the tire measured at the center part of the tire crown portion, but extend in an opposite direction to the cords associated with an adjacent ply.

About the outside of the plies 2 at the crown portion 5 a breaker 7 is superimposed composed of 2 nylon cords of 840 denier/2 strands.

In the present example, the cord diameter of the 1,890 denier/2 strands is 0.76 mm, and the cord diameter of the 1,260 denier/2 strands is 0.61 mm. As a result, a ratio of these cord diameters is 1:0.80. A ratio of number of plies of the innermost small diameter ply group of 1,260 denier/2 strands to the total number of plies excluding the turn-up portions and counted at the intermediate region between the maximum width position of the tire and the bead portion is 0.25 and a ratio of number of plies of the outermost small diameter cord ply group of 1,260 denier/2 strands to the total number of plies excluding the turn-up portions and counted at the intermediate region between the maximum width position of the tire and the bead portion is 0.25.

Figure 7:
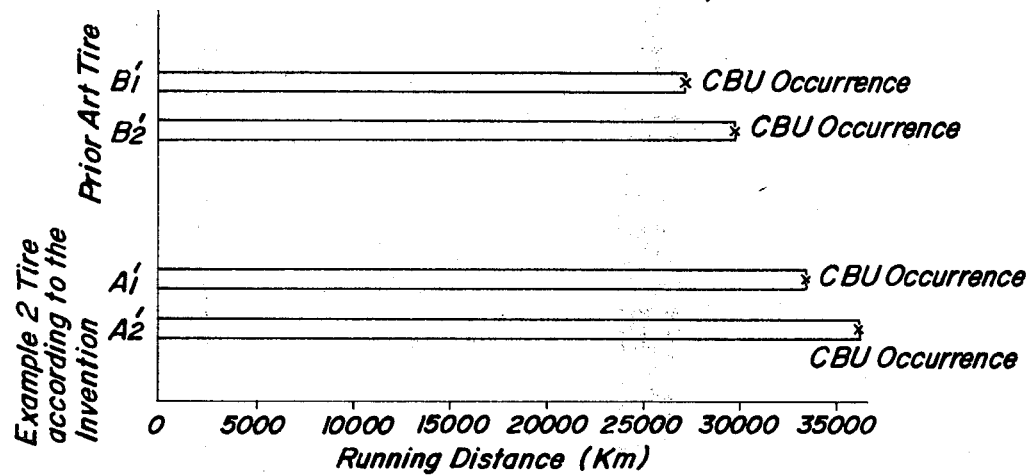
FIG. 7 is a graph illustrating a cord breaking up failure as a function of running distance of the tire according to the invention and shown in FIG. 6 as compared with that of another conventional tire.

FIG. 7 shows a graph illustrating an excellent resistance to the cord breaking up failure obtained by the tires according to the present example as compared with that obtained by prior art tires. In FIG. 7, the kind of the tires to be tested is plotted on the ordinate, while the running distance is plotted on the abscissa. The tires were subjected to an acceleration test which makes use of an indoor drum testing machine under the following conditions.

Rim: A normal rim of $7.50V \times 20IR$
Internal pressure: 4.0 kg/cm$^2$
Load: 2,770 kg
Speed: 60 km/h.

In order to adjust the internal temperature of the tire, the tread rubber at the crown portion was scraped off by a thickness of about 15 mm.

In FIG. 7, $A_1'$ and $A_2'$ show test results obtained by the tire constructed according to the invention and described with reference to the present example, while $B_1'$ and $B_2'$ show test results obtained by prior art tires. In the prior art tire, the plies 2 for constituting the carcass body are composed of one kind of nylon cord ply group of 1,260 denier/2 strands. Total number of plies is 10, among which 4 inside plies are wound around the bead core 1a from the inside toward the outside thereof and 4 outside plies are wound around the bead core 1b from the inside toward the outside thereof, the remainder of the tire inclusive of an overall strength of the carcass being the same as those of the example 2.

As can be seen from FIG. 7, the prior art tires $B_1'$ and $B_2'$ induced the cord breaking up failure at running distances of 27,200 km and 29,800 km, respectively. On the contrary, the tires $A_1'$ and $A_2'$ constructed according to the invention and described with reference to the example 2 induced the cord breaking up failure at running distances of 33,500 km and 36,200 km, respectively. Thus, the tires $A_1'$ and $A_2'$ exhibited an excellent resistance to the cord breaking up failure which is about 1.22 times higher than that of the prior art tires.

EXAMPLE 3

Figure 8:
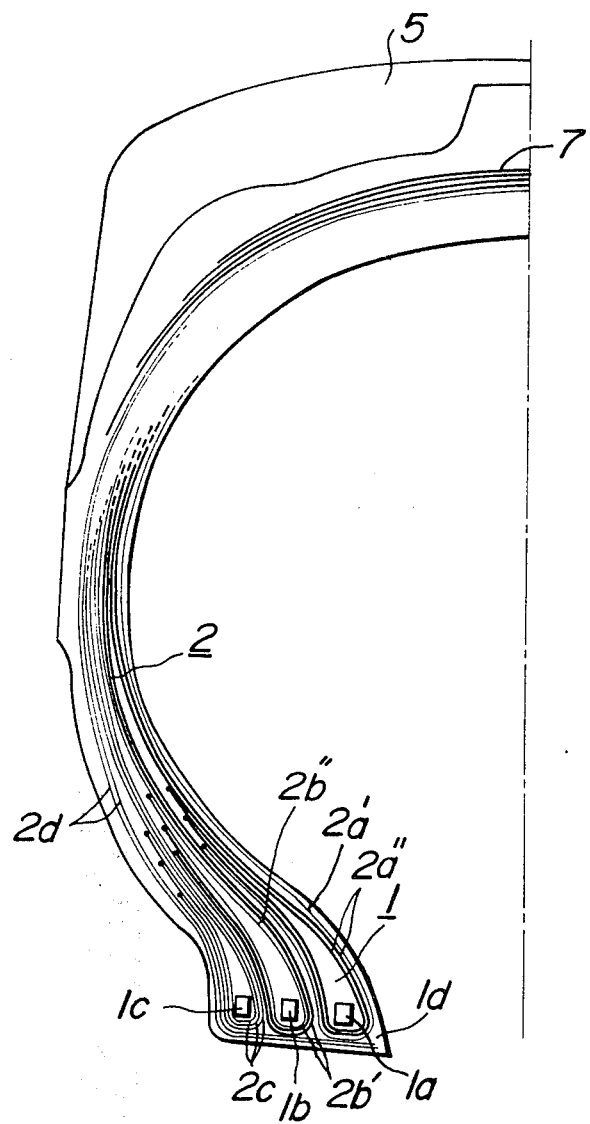
FIGS. 8 to 10 are cross-sectional views of one-half of various further embodiments of a pneumatic tire according to the invention each taken on a plane containing a rotational axis of the tire.

FIG. 8 shows one-half of a further embodiment of a pneumatic tire according to the invention in section taken on a plane containing a rotational axis of the tire. The tire has a size of 24.00-49 42PR, 42PR being indicated on the basis of cotton yarn.

In the present example, a bead portion 1 comprises three sets of bead cores 1a, 1b, 1c. A ply 2 constituting a carcass body is composed of two kinds of nylon cord ply groups of 2,520 denier/2 strands and 1,260 denier/2 strands, respectively. Total number of plies is 22. In FIG. 8, 2 plies are designated by a single line.

Among the total plies, a ply stack 2a is composed of 6 nylon cord plies whose 2 inside cord plies 2a' are 1,260 denier/2 strands and 4 outside cord plies 2a" are 2,520 denier/2 strands. These inside and outside cord plies 2a', 2a" as a whole are wound around the bead core 1a from the inside toward the outside thereof to form turn-up portions. A ply stack 2b is composed of 6 nylon cord plies whose 4 inside cord plies 2b' are of 2,520 denier/2 strands and 2 outside cord plies 2b" are of 1,260 denier/2 strands.

These inside and outside cord plies 2b', 2b" as a whole are wound around the bead core 1b from the inside toward the outside thereof to form turn-up portions. A ply stack 2c is composed of 6 nylon cord plies of 1,260 denier/2 strands and wound around the bead core 1c from the inside toward the outside thereof to form turn-up portions. Finally, an outside ply stack 2d is composed of 4 nylon cord plies of 1,260 denier/2 strands and bent at a bead heel portion from the outside toward the inside thereof and extends along the lower surface of the bead cores 1c, 1b, 1a and firmly secured to a bead toe portion 1d.

The cords of each of these plies are inclined at about 35° with respect to the circumferential direction of the tire measured at the center part of the tire crown portion, but extend in an opposite direction to the cords associated with adjacent ply.

About the outside of the plies 2 at the crown portion 5 a breaker 7 is superimposed composed of 4 nylon cord plies of 840 denier/2 strands.

In the present example, the cord diameter of the 2,520 denier/2 strands is 0.90 mm and the cord diameter of the 1,260 denier/2 strands is 0.61 mm. As a result, a ratio of these cord diameters is 1:0.68. A ratio of number of plies of the innermost small diameter ply group of 1,260 denier/2 strands to the total number of plies excluding the turn-up portions and counted at the intermediate region between the maximum width position of the tire and the bead portion is 0.09 and a ratio of number of plies of the outermost small diameter cord ply group of 1,260 denier/2 strands to the total number of plies excluding the turn-up portions and counted at the intermediate region between the maximum width position of the tire and the bead portion is 0.55.

EXAMPLE 4

Figure 9:
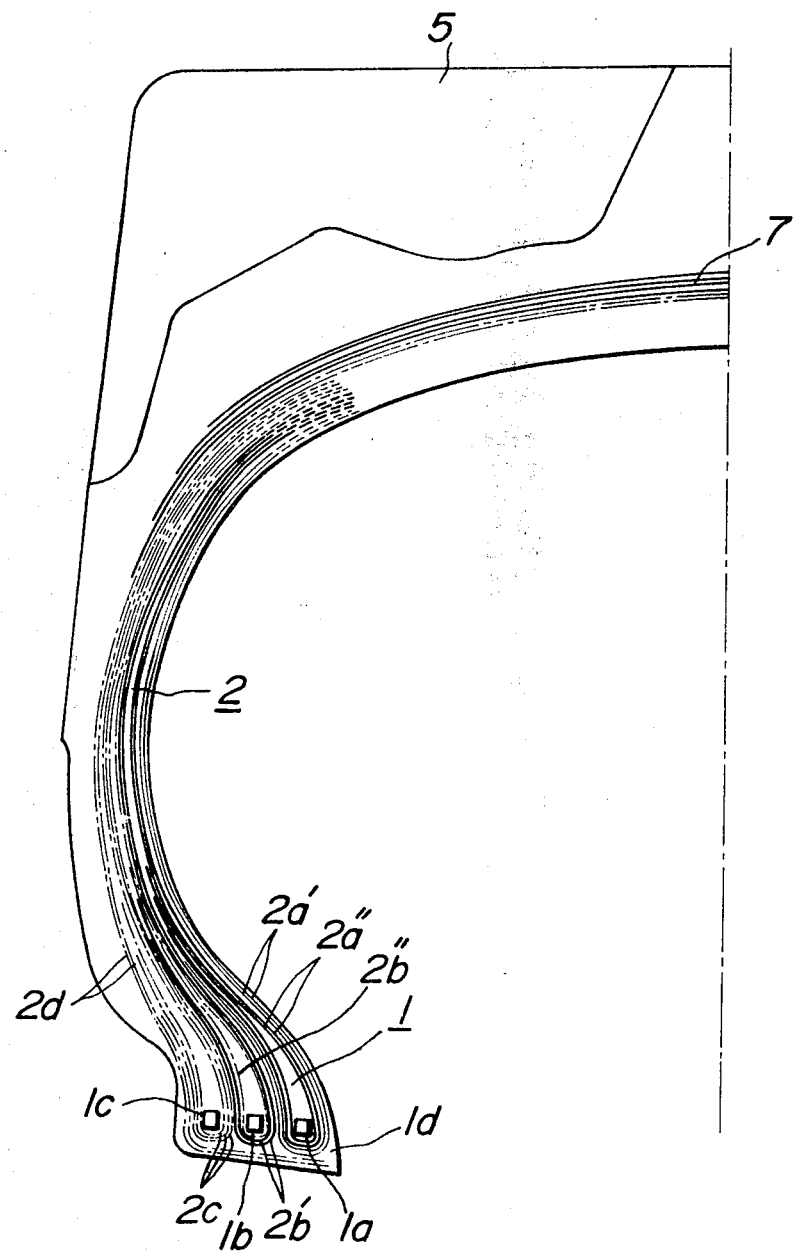

FIG. 9 shows one-half of a still further embodiment of a pneumatic tire according to the invention in section taken on a plane containing a rotational axis of the tire. The tire has a size of 37.25-35 36PR, 36PR being indicated on the basis of cotton yarn.

In the present example, a bead portion 1 comprises three sets of bead cores 1a, 1b, 1c. Plies 2 for constituting a carcass body are composed of three kinds of nylon cord ply groups of 1,890 denier/2 strands, 1,260 denier/2 strands and 840 denier/2 strands, respectively. Total number of these plies is 24. In FIG. 9, 2 piles are designated by a single line.

Among the total plies, a ply stack 2a is composed of 8 nylon cord plies whose 4 inside cord plies 2a' are of 1,260 denier/2 strands and 4 outside cord plies 2a" are of 1,890 denier/2 strands. These inside and outside cord plies 2a', 2a" as a whole are wound around the bead core 1a from the inside toward the outside thereof to form turn-up portions. A ply stack 2b is composed of 6 nylon cord plies whose 4 inside cord plies 2b' are of 1,890 denier/2 strands and 2 outside cord plies 2b" are of 840 denier/2 strands. These inside and outside cord plies 2b', 2b" as a whole are wound around the bead core 1b from the inside toward the outside thereof. A ply stack 2c is composed of 6 nylon cord plies of 840 denier/2 strands and wound around the bead core 1c from the inside toward the outside thereof to form turn-up portions. Finally, an outside ply stack 2d is composed of 4 nylon cord plies of 840 denier/2 strands and bent at a bead heel portion from the outside toward the inside thereof and extends along the lower surface of the bead cores 1c, 1b, 1a and firmly secured to a bead toe portion 1d.

The cords of each of these plies are inclined at about 35° with respect to the circumferential direction of the tire measured at the center part of the tire crown portion, but extend in an opposite direction to the cords asociated with adjacent ply.

About the outside of the plies 2 at the crown portion 5 a breaker 7 is superimposed composed of 4 nylon cord plies of 840 denier/2 strands.

In the present example, the cord diameter of the 1,890 denier/2 strands is 0.76 mm, the cord diameter of the 1,260 denier/2 strands is 0.61 mm and the cord diameter of the 840 denier/2 strands is 0.51 mm. As a result, a ratio of these cord diameters is 1:0.80:0.67. A ratio of number of plies of the innermost intermediate diameter ply group of 1,260 denier/2 strands to the total number of plies excluding the turn-up portions and counted at the intermediate region between the maximum width position of the tire and the bead portion is 0.17 and a ratio of number of plies of the outermost small diameter cord ply group of 840 denier/2 strands to the total number of plies excluding the turn-up portions and counted at the intermediate region between the maximum width position of the tire and the bead portion is 0.50.

EXAMPLE 5

Figure 10:
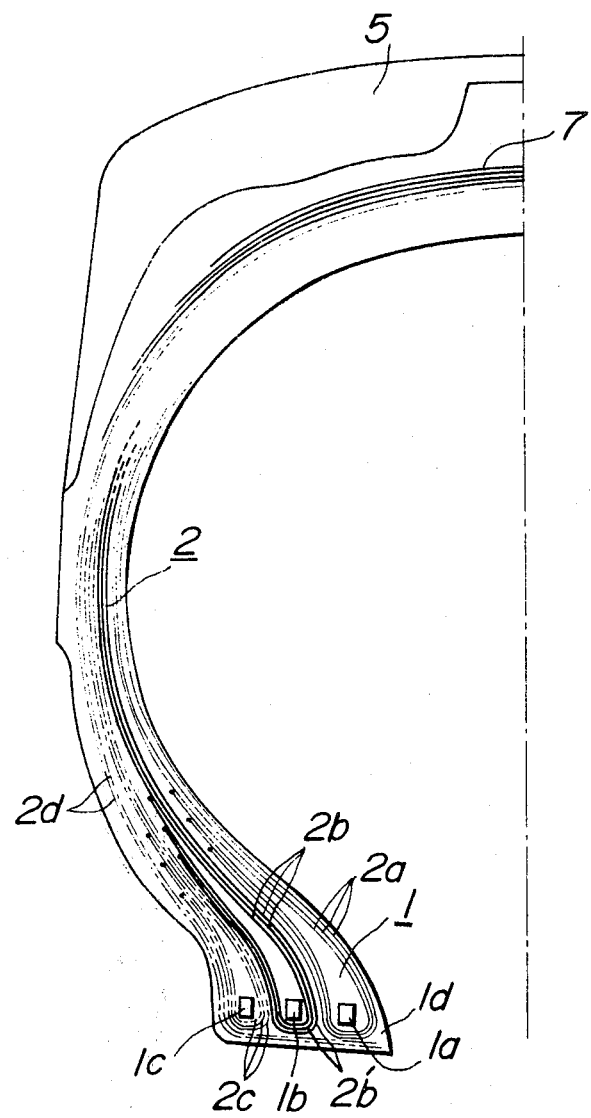

FIG. 10 shows one-half of another embodiment of a pneumatic tire according to the invention in section taken on a plane containing a rotational axis of the tire. The tire has a size of 24.00-49 42PR, 42PR being indicated on the basis of cotton yarn.

In the present example, a bead portion 1 comprises three sets of bead cores 1a, 1b, 1c. Plies 2 constituting a carcass body are composed of three kinds of nylon cord ply groups of 2,520 denier/2 strands, 1,890 denier/2 strands and 1,260 denier/2 strands, respectively. Total number of these plies is 22. In FIG. 10, 2 plies are designated by 1 line.

Among the total plies, a ply stack 2a is composed of 6 nylon cord plies of 1,890 denier/2 strands. These plies as a whole are wound around the bead core 1a from the inside toward the outside thereof to form turn-up portions. A ply stack 2b is composed of 6 nylon cord plies of 2,520 denier/2 strands and is wound around the bead core 1b from the inside toward the outside thereof to form turn-up portions. A ply stack 2c is composed of 6 nylon cord plies of 1,260 denier/2 strands and is wound around the bead core 1c from the inside toward the outside thereof to form turn-up portions. Finally, an outside ply stack 2d is composed of 4 nylon cord plies of 1,260 denier/2 strands and bent at a bead heel portion from the outside toward the inside thereof and extends along the lower surface of the bead cores 1c, 1b, 1a and firmly secured to a bead toe portion 1d.

The cords of each of these plies are inclined at about 35° with respect to the circumferential direction of the tire measured at the center part of the tire crown portion, but extend in an opposite direction to the cords associated with adjacent ply.

About the outside of the plies 2 at the crown portion 5 is superimposed a breaker 7 composed of 4 nylon cord plies of 840 denier/2 strands.

In the present example, the cord diameter of the 2,520 denier/2 strands is 0.90 mm, the cord diameter of the 1,890 denier/2 strands 0.76 mm and the cord diameter of the 1,260 denier/2 strands is 0.61 mm. As a result, a ratio of these cord diameters is 1:0.84:0.68. A ratio of number of plies of the innermost intermediate diameter ply group of 1,870 denier/2 strands to the total number of plies excluding the turn-up portions and counted at the intermediate region between the maximum width position of the tire and the bead portion is 0.27 and a ratio of number of plies of the outermost reduced diameter cord ply group of 1,260 denier/2 strands to the total number of plies excluding the turn-up portions and counted at the intermediate region between the maximum width position of the tire and the bead portion is 0.45.

All of the tires according to the invention and described with reference to FIGS. 8, 9 and 10 exhibited an excellent resistance to the cord breaking up failure which is equal or superior to those of the tires according to the invention and described with reference to the Examples 1 and 2. Accordingly, in these embodiments, relating to a giant tire, the total number of plies exceeds 10, that is, greater than upper range of tires disclosed in Examples 1 and 2. This invention, preventing breakage of cords in the inner and outer ply groups due to compressive strain, is most effective in such giant tires.

What is claimed is:

1. A pneumatic tire for off-road, industrial or heavy load vehicles offering improved resistance to cord breaking up failure comprising; a bias laid carcass body composed of a plurality of stacks of plies including at least three superimposed rubberized organic fiber cord ply groups which are different in cord diameter, each of said ply groups including a plurality of plies, the total number of plies at least 10, the cords of substantially one-half of said plies extending in an opposite direction to the cords associated with the remainder of plies, said ply groups being composed and arranged such that the cord diameter of the outermost ply group is smaller than that of the ply group located adjacent to and inside said outermost ply group and at most equal to that of the innermost ply group and the cord diameter of the innermost carcass ply group is smaller than that of the ply group located adjacent to and outside said innermost carcass ply group, bead portions each having at least two bead cores, further comprising an outermost stack of plies composed of at least two plies and extending along the lower surface of said bead cores and finally secured at its one end to the lower surface of said bead cores, wherein all of the boundary surfaces formed between adjacent ply groups different in cord diamter are located between inner plies of a stack of plies extending along the lower surface of said bead cores and secured at its one end to the lower surface of said bead cores.

2. The pneumatic tire according to claim 1, wherein said carcass body is composed of three ply groups which are different in cord diameter and the cord diameter of the outermost ply group is made equal to that of the innermost ply group and a ratio of the cord diameter of two of said three kinds of ply groups is within a range between 1:0.89 to 0.62.

3. The pneumatic tire according to claim 2, wherein said carcass body composed of three ply groups which are differnt in cord diameter is of a stack of superimposed plies in which a ratio of number of plies of the innermost small diameter cord ply group to total number of plies excluding a turn-up portion of each ply and counted at the intermediate region between the maximum width position of the tire and a bead portion is within a range between 0.06 and 0.67 and a ratio of number of plies of the outermost small diameter cord ply group to said total number of plies is within a range between 0.07 and 0.60.

4. The pneumatic tire according to claim 1, wherein said carcass body is composed of three kinds of ply groups which are different in cord diameter and in which the cord diameter of the outermost ply group is made smaller than that of the innermost ply group and a ratio of the cord diameters of said three kinds of ply groups is within a range of 0.89 to 0.62:1:0.73 to 0.40 counted from the inside toward the outside of said carcass.

5. The pneumatic tire according to claim 4, wherein said carcass body composed of three kinds of ply groups which are different in cord diameter is of a stack of superimposed plies in which a ratio of number of plies of the innermost cord ply group to total number of plies excluding a turn-up portion of each ply and counted at the intermediate region between the maximum width position of the tire and a bead portion is within a range between 0.06 and 0.67 and a ratio of number of plies of the outermost cord ply group to said total number of plies is within a range between 0.07 and 0.60.

6. The pneumatic tire according to claim 1, wherein a boundary surface formed between adjacent ply groups which are different in cord diameter is located between the inner plies of a first stack of plies wound around an outermost bead core in the same direction or located between the inner plies of a second stack of plies wound around a bead core located adjacent to and inside said outermost bead core in the same direction or located between the inner plies of said outermost stack of plies extending along the lower surface of the bead core and firmly secured at its one end to the lower surface of the bead core.

7. The pneumatic tire according to claim 6, all of boundary surfaces formed between adjacent ply groups different in cord diameter are located between the inner plies of a stack of plies wound around the same bead core in the same direction or located between the inner plies of said outermost stack of plies adjacent to said stack of plies and extending along the lower surface of the bead core and firmly secured at its one end to the lower surface of said bead core.

8. A pneumatic tire for off-road, industrial or heavy load vehicles offering improved resistance to cord breaking up failure comprising; a bias laid carcass body composed of a plurality of stacks of plies including at least three superimposed rubberized organic fiber cord ply groups which are different in cord diameter, each of said ply groups including a plurality of plies, the total number of plies at least 10, the cords substantially one-half of said plies extending in an opposite direction to the cords associated with the remainder of said plies, said ply groups being composed and arranged such that the cord diameter of the outermost carcass ply group is smaller than that of the ply group located adjacent to and inside said outermost ply group and at most equal to that of the innermost ply group and the cord diameter of the innermost carcass ply group is smaller than that of the ply group located adjacent to and outside said innermost carcass group, bead portions each having at least two bead cores, and an outermost stack of at least two plies extending along the lower surface of said bead cores and firmly secured at its one end to the lower surface of said bead cores.

9. The pneumatic tire of claims 1 or 8 wherein said bead portions each have three bead cores.

* * * * *